United States Patent
Knuttel et al.

(10) Patent No.: US 6,611,338 B1
(45) Date of Patent: Aug. 26, 2003

(54) METHOD AND APPARATUS FOR THE INTERFEROMETRIC EXAMINATION OF SCATTERING OBJECTS

(75) Inventors: Alexander Knuttel, Birkenau (DE); Paul Welker, Bissersheim (DE); Christian Kugler, Schwetzingen (DE); Reiner Rygiel, Dossenheim (DE)

(73) Assignee: ISIS Optronics GmbH (DE)

( * ) Notice: Subject to any disclaimer, the term of this patent is extended or adjusted under 35 U.S.C. 154(b) by 169 days.

(21) Appl. No.: 09/713,076

(22) Filed: Nov. 15, 2000

(Under 37 CFR 1.47)

(30) Foreign Application Priority Data

Nov. 17, 1999 (DE) .......................... 199 55 268

(51) Int. Cl.[7] .................................. G01B 9/02
(52) U.S. Cl. ...................................... 356/479
(58) Field of Search ................. 356/479, 477, 356/484, 497

(56) References Cited

U.S. PATENT DOCUMENTS 5,570,182 A * 10/1996 Nathel et al. .............. 356/477
5,795,295 A    8/1998 Hellmuth et al. ........... 669/948
5,835,215 A   11/1998 Toida et al. ................. 356/349
6,015,969 A *  1/2000 Nathel et al. ............ 250/227.27

FOREIGN PATENT DOCUMENTS

| DE | 44 29 578 A1 | 6/1996 |
| DE | 197 00 592 A1 | 1/1997 |
| WO | WO 92/19930 | 11/1992 |
| WO | WO 97/27468 | 7/1997 |

* cited by examiner

*Primary Examiner*—Samuel A. Turner
*Assistant Examiner*—Michael A. Lyons
(74) *Attorney, Agent, or Firm*—Walter A. Hackler

(57) ABSTRACT

The invention proposes a method for the optimization of the interferometric examination of scattering objects, wherein intensity-modulated light is divided, one beam is directed into an object and the other beam is directed to a reference mirror, the reflected light is guided to a detector module, where it is converted to an interference signal and this signal is evaluated. The method is characterized by the fact that light of at least two different central wavelengths is irradiated and the converted interference signals of both central wavelengths are phase-shifted in order to compensate for their expected dispersion.

17 Claims, 9 Drawing Sheets

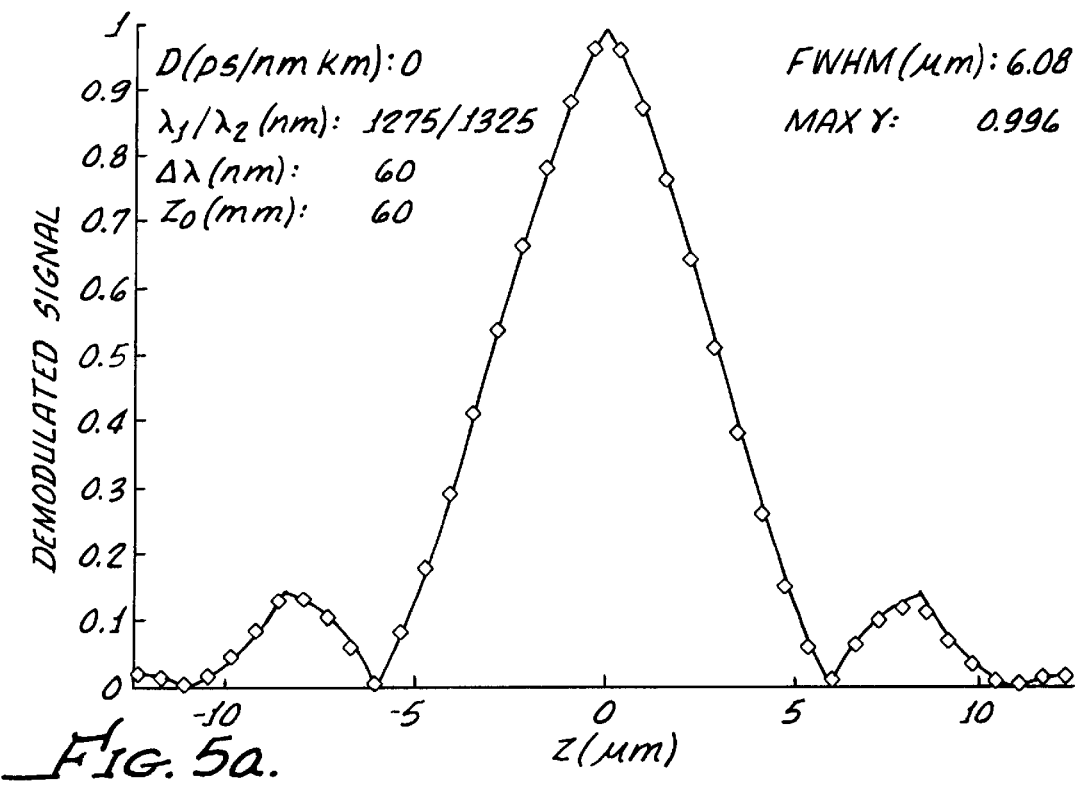
_Fig. 5a._
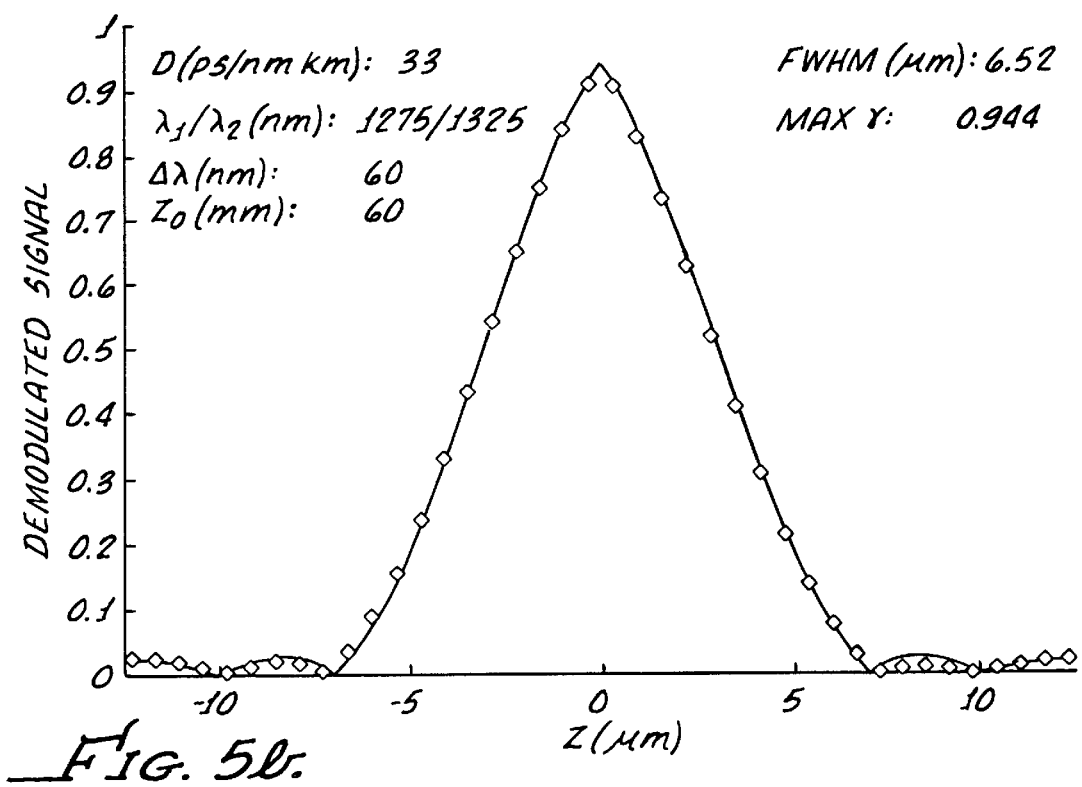
_Fig. 5b._

METHOD AND APPARATUS FOR THE INTERFEROMETRIC EXAMINATION OF SCATTERING OBJECTS

BACKGROUND OF THE INVENTION

The invention applies to a method and an apparatus for the interferometric examination of scattering objects.

Scattering objects, in particular strongly scattering materials, can be investigated with optical coherence tomography (OCT), according to the current state of the art up to a penetration depth in beam direction of 3 mm. Together with a sampling, transversal to the beam direction, in one or in both dimensions, a 2D- or 3D-picture is generated.

During the interferometric sampling, a partial beam reflected by the object interferes with a partial beam reflected by a reference mirror which is movable in beam direction. Alternatively, the entire interferometer can be moved. The interference signals, converted opto-electronically by sensors, are demodulated to form a unipolar demodulation signal, used to obtain a digital image of the object. Envelope curves of the interference signals result. With respect to the current state of the art, reference is made to WO 97/27468 the contents of which is incorporated herein by reference.

The more broadband the irradiated light is, the smaller is the full width half maximum (FWHM) of the demodulation signal and thus the spatial resolution in depth direction. This, however, is impaired by dispersion due to wavelength-depending transit time differences of the received signals between object arm and reference arm. It is tried to achieve a dispersion compensation by balancing both optical arms. However, due to the unknown optical characteristics of the object to be investigated, which can even change depending of the penetration depth, this cannot be completely obtained. A complete compensation is hardly possible as both optical arms cannot be exactly the same. This becomes even more relevant if higher orders of dispersion have to be taken into account. Furthermore, additional elements used for compensation can cause negative results concerning the signal propagation in the interferometer.

In the field of medicine, optical coherence tomography can be applied for the examination of scattering objects accessible outside the body, as e.g. skin, nails, lips etc., or endoscopically, for the examination of the bronchial system, the gastrointestinal tract, or the lungs. In non-medicinal fields, the examination of thin, optically scattering plastic or ceramic layers is possible.

It has already been proposed to increase the spectral bandwidth by combining a plurality of central wavelengths, in order to increase the depth resolution. This is known for example from U.S. Pat. No. 5,795,295. Further interferometer arrangements working with two central wavelengths are known from U.S. Pat. No. 5,835,215, DE 19700592 A1 and WO 92/19930 A1. From DE 4429578 A1, use of intensity modulated light is known.

BRIEF SUMMARY OF THE INVENTION

The invention addresses the problem of making available a method and a device for further increasing the spatial resolution in optical coherence tomography.

According to the invention, this problem is solved by a method for the interferometric examination of scattering objects, wherein intensity-modulated light is divided, one beam directed into an object and another beam directed to a reference mirror, the reflected light is lead to a detector module by which it is converted opto-electronically to an interference signal and this signal is evaluated, light of at least two different central wavelengths is irradiated into the object and onto the reference reflector and the converted interference signals of the central wavelengths are shifted relative to each other for compensating the expected dispersion of their phase position.

The intensity modulation of the irradiated light allows a considerable increase of the instantaneous maximum light intensity as compared to a continuous light beam, without an increase of the overall power and without an unfavorable increase of the device temperature and the object temperature. This also increases the detected interference signal, thus obtaining an improved signal-to-noise ratio. If a fast A/D-converter is used, e.g. 10 MHz, and for modulation frequencies of the interference signal in the 100 kHz range, an On/Off sampling ratio of 1/100 is obtained. The maximum light power can be increased in the reciprocal ratio (here: 100/1), without increasing the average overall power. This is particularly true for surface emitters, as e.g. surface emitting LED's.

The intensity modulation of the signals of the at least two central wavelengths, is preferably phase-shifted relative to each other. The detected interference signals are preferably digitized and stored in a computer. Thereafter the saved digital values of both interference signals are shifted against each other in the computer, for dispersion compensation. The intensity modulation of the irradiated light, respectively of one wavelength, is preferably realized with a phase shift of about $\pi/2$ of the respective central wavelength. An exact offset of $\pi/2$ for different central wavelengths, however, cannot be obtained, and is not necessary.

According to preferred embodiments of the invention, a digital modulation of the light from the light source (by switching on and off), or a modulation with continuous intensity change may be used. In the latter case, the light is modulated, in particular, with a sinus wave. A disadvantage of this soft intensity modulation with sinosoidal control is a decrease of the effective sampling ratio, and thus, a decrease of the effective power gain. On the other hand, there are no high frequency components due to sharp pulse edges, as with digital modulation.

The invention generates an effective spectrum which offers much more bandwidth than the spectrum of the individual light sources. However, the dispersion is limited to the individual dispersion of the individual light sources (for one central wavelength). This results in the following advantages: Reduced dependence of the dispersion from the penetration depth of the light into the object; good dispersion compensation also for higher orders; no additional optical materials in one of the optical object arms or reference arms.

For a further FWHM reduction, a preferred embodiment of the invention proposes the formation of the magnitude difference between the added signals (in-phase-signal, $I_{in}$) and the subtracted signals (out-off-phase-signal $I_{out}$) from at least two interference signals with different central wavelengths, taking into account a weighting factor W, according to the following equation:

$$I_{ges} = |I_{in} - W|I_{out}||  \quad (1)$$

The weighting factor should preferably be <1 and >0.3. A corresponding difference formation unit may be provided in the computer of the apparatus of the invention.

A further embodiment comprises the formation of the signal magnitudes of at least two central wavelengths, and the incoherent addition of the magnitude signals.

As an interference signal can be divided into magnitude and phase, another advantageous variant of the method of the invention is characterized by that fact that the particle velocity ($v_p$) in the object is determined relative to the (known) travel velocity $v_o$ of the reference mirror, deducted from the phase difference $\Delta\phi=\phi(z_1)-\phi(z_2)$ according to $$V_p/v_o=(\lambda/4\pi)\cdot(\Delta\phi/\Delta Z) \quad (2)$$

wherein $\Delta Z=z_1-z_2$.

The apparatus is equipped with phase and velocity determination units, for determining velocities $v_p$ in the object, according to this method.

BRIEF DESCRIPTION OF THE DRAWINGS

The light sources may be embodied as one- or two-dimensional array light sources, respectively, or as surface light sources, as e.g. surface emitting LED's. In analogy to the light source, the detector may be an individual element, a one- or two-dimensional array, or a CCD detector.

Further advantages and characteristics of this invention can be taken from the claims and from the subsequent description of preferred embodiments of the invention, referring to the drawings, wherein:

FIG. 2b shows the marginal range of the interference signal of the two different central wavelengths of FIG. 2a;

FIGS. 5a–c show the signals of FIGS. 4a, 4b and 4d, after further correction by formation of the difference between added and subtracted interference signals.

DETAILED DESCRIPTION

Figure 1:
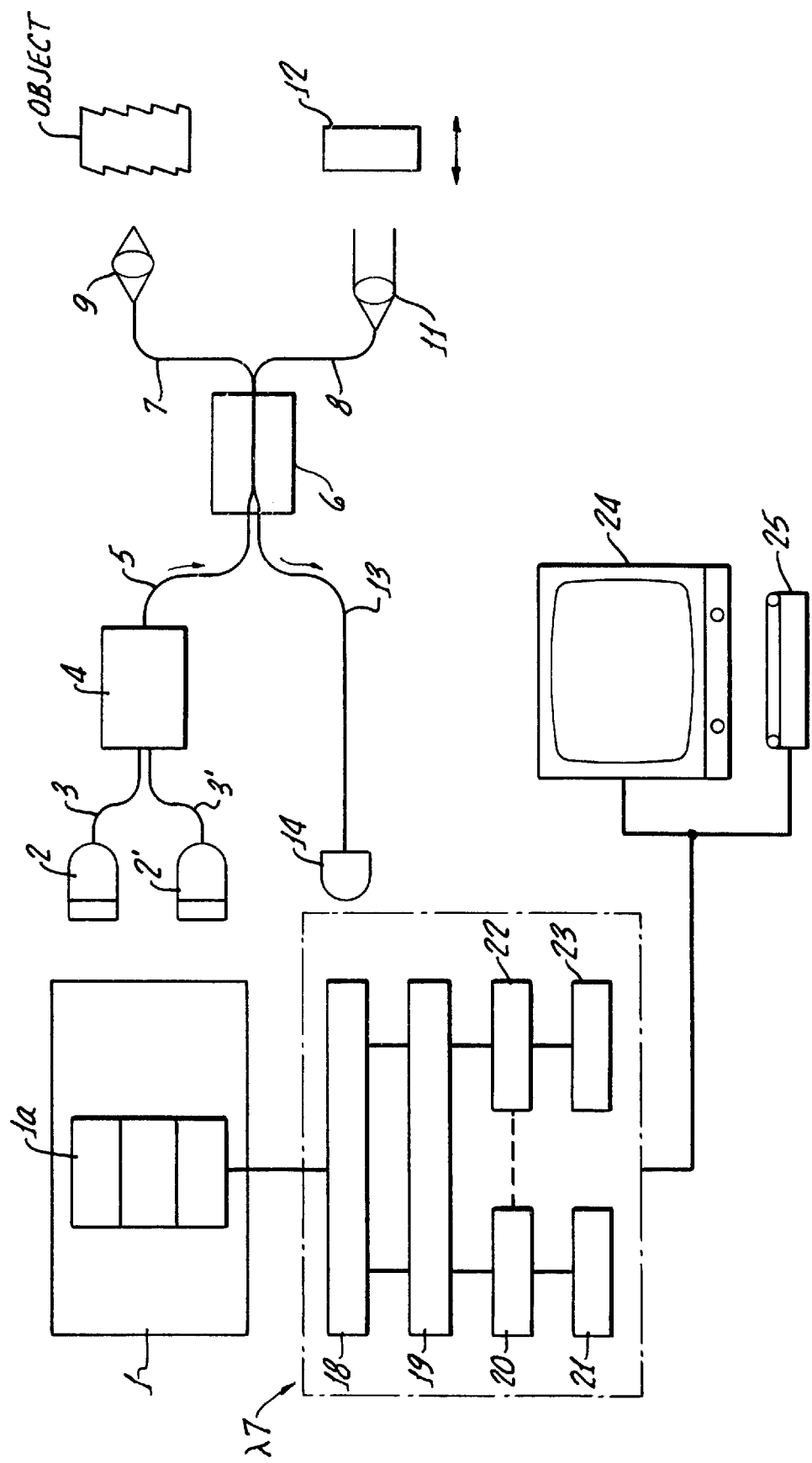
FIG. 1 shows the design of an apparatus according to the invention with optical waveguide system.

FIG. 1 shows a first design of an apparatus according to the present invention. It is equipped with a control unit 1 for the control of two light sources 2, 2', with different central wavelengths $\lambda 1$, $\lambda 2$ preferably in the infrared range. Light sources 2, 2, 2' may be, e.g., light-emitting diodes (LED). Light sources 2, 2, 2' are connected to optical waveguides 3, 3' leading to a beam combiner 4; a further optical waveguide 5 leads to an optical coupler 6. This coupler divides the light from the light source arm 5 to the sample arm 7 and to the reference arm 8. Via the sample arm 7 and an optical system 9 the light is irradiated into an object O to be examined. Via the reference arm 8, and an optical system 11 next in line, the light is directed to a reference reflector 12, movable in beam direction (vertical to its surface), allowing a (continuous) change of the optical path length between beam splitter 6 and reference reflector 12. The relative change of the sample arm relative to the reference arm which is required for the depth sampling of the object, is obtained either by moving the reference reflector or the object. Alternatively, an interferometer which has a static reference arm can be moved, relative to the object.

The light scattered back from the object O and reflected by the reference reflector 12, enters into the sample arm 7 and into the reference arm 8, and is lead, via coupler 6, into a light guide adjacent to the light source arm 5, forming the detector arm 13 of the apparatus. The light of both wavelengths is received by the light detector 14, which is located at the end of detector arm 13. After an opto-electronic conversion, the received signals are lead to an electronic processing unit 17 which comprises a digitalization unit 18, a memory register 19, a shifting unit 20, and, if necessary, a difference formation unit 21. Furthermore, the processing unit 17 is equipped, downstream from the memory register 19, with a phase determination unit 22 and, further downstream, with a velocity determination unit 23. The electronic processing unit may be provided with output devices, e.g. a monitor 24, or a printer 25. In the digitalization unit 18, the analogous interference signals are digitized by sampling them in given intervals and storing the obtained values, according to the sequence shown in FIG. 3, in successive storage cells; the entirety of these values represents the demodulation signal. Movements in the object can be detected by the phase and velocity determination units 22, 23.

The control unit 1 is equipped with a modulation device 1a for phase-shifted modulation of the light sources 2, 2', preferably realized by time-shifted pulsing of the light sources 2, 2'. The modulation device 1a is synchronized with the digitalization unit 18 via connection 21.

The optical elements 3 to 13 may be in form of an integrated optical circuit (optical chip), as known from WO 97/27468. Furthermore, the light sources 2, 2' and the detector 14 may be integrated therewith or coupled thereto.

Instead of an optical arrangement 2 to 14 operating with optical waveguides or integrated in an optical chip, it is also possible to realize an optical free beam arrangement by means of mirrors; in this case, suitable optical elements, e.g. lenses, are arranged downstream from the light sources 2, 2'. The beam combiner 4 and the optical coupler 6 can be designed as beam splitters by means of semitransparent mirrors.

A combination of an integrated optical system with optical waveguides and a free-beam optical system is possible, too.

Whereas the light sources 2, 2' are shown as spatially separated light sources in FIG. 1, light sources of different light wavelength may also be integrated in a compact emitter.

Figure 2A:
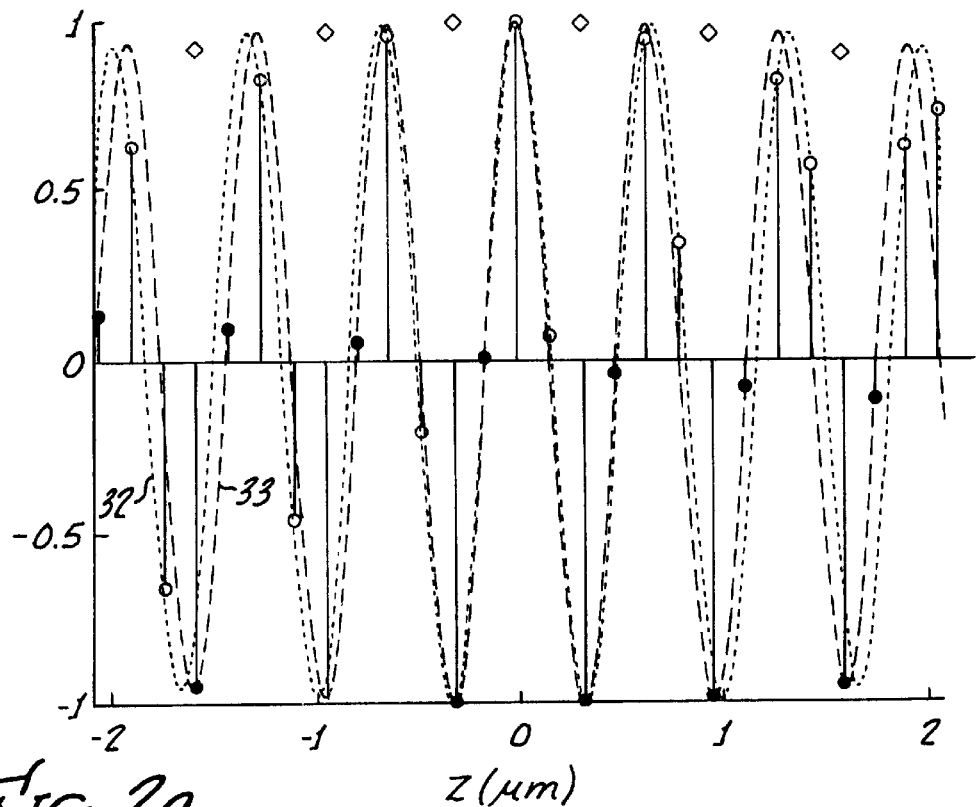
FIG. 2a shows the central range of an interference signal of two different central wavelengths.
Figure 2B:
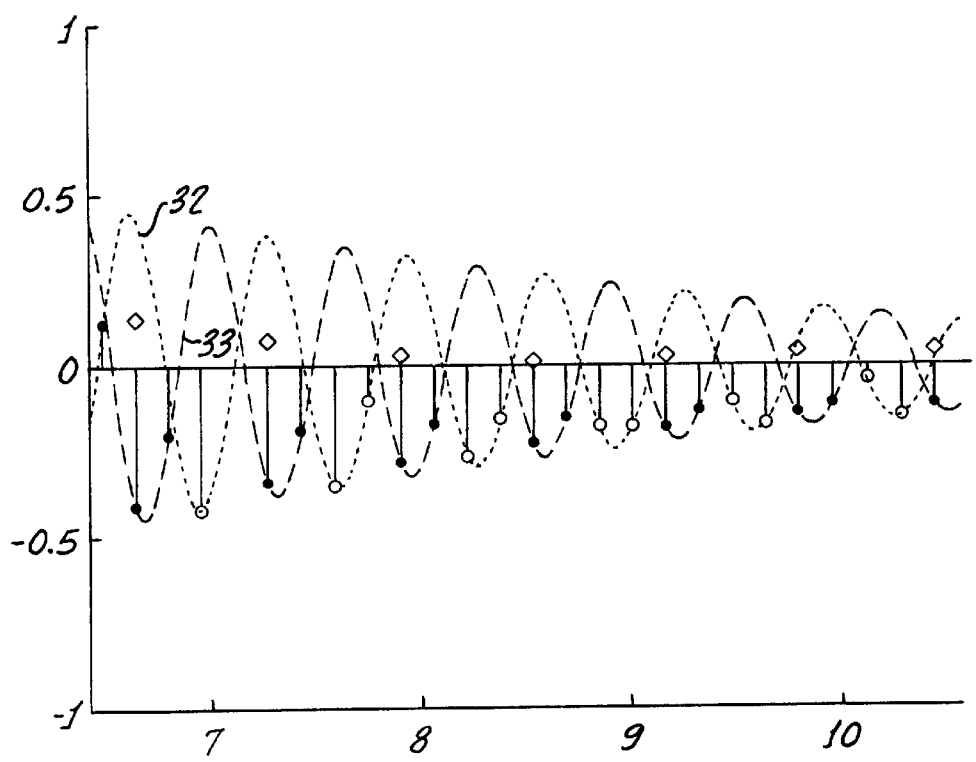

FIGS. 2a and 2b show an interference signal 31, generated by a apparatus according to FIG. 1, by exposure of an object O to light with different central wavelengths and converted by detector 14, in its central range in FIG. 2a and in its marginal range in FIG. 2b. The envelope curves represented by the rhombs, stand for the corresponding demodulation signal/magnitude signal. The dotted and dashed curves represent the signals 32, 33, caused by different irradiated wavelengths, in case of a continuous, unpulsed irradiation. The closed points and the circles (not filled in) represent sampling points for the digitalization of the received signal, namely the open circles for wave 32 and the closed points for wave 33. The points in time at which pulsed light is irradiated are with respect to both wavelengths synchronous to these detection points. For the central peaks of both signals (superposed here, whereas divergent in the marginal range; FIG. 2b)it is clearly visible that the phase difference between two irradiated pulses is approximately π/2.

The central wavelengths alternate between the irradiated pulse pairs. For the curve in FIG. 2, two pulses are irradiated with a distance of approximately π/2: First for one central wavelength (curve 32) and then for the other central wavelength (curve 33). As the pulse trains of both wavelengths have a non-constant phase relation to each other, their phase positions are shifted over the depth Z of the interference signal. Furthermore, from FIGS. 2a and 2b it can be seen that in the central range (FIG. 2a) of the interference signal, the carrier signals are practically in phase, whereas in the marginal range (FIG. 2b)the signals are out of phase by π.

FIG. 3 shows different alternatives for pulsed irradiation of two different central wavelengths. In FIG. 3a, the same wavelength is irradiated subsequently two times, i.e. the first wavelength and the second wavelength at phase 0 and approximately π/2 respectively.

Figure 3A:
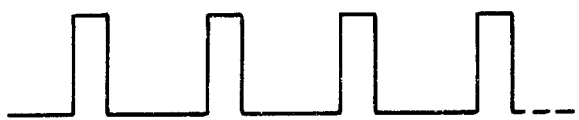
FIGS. 3a–d show different possibilities of intensity modulation in the scope of the method according to the invention.
Figure 3B:
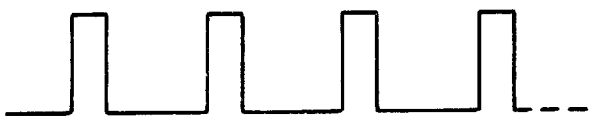

For a phase difference of approximately π/2, the demodulation signal can be determined in known manner. Even if the phase difference differs from π/2 (e.g. in the range of π/4 to 3π/4) the demodulation signal can be calculated, if the phase difference is known. However, the bigger the difference from π/2 is, the bigger is the scattering of the calculated values. FIG. 3b shows alternating irradiation of central wavelengths before cycle repetition.

Figure 3C:
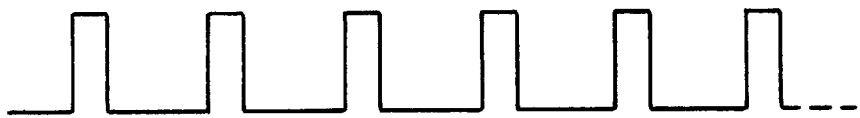
Figure 3D:

The distance of the pulses of identical central wavelengths can amount to an odd multiple of π/2. In the example of FIG. 3c, three phase positions were chosen: 0, π/3 and 2π/3. In FIG. 3d, it is supposed that the pulses (with different central wavelengths) are irradiated at such short intervals that the detection unit almost "sees" the same phase situation. The statements made with reference to FIGS. 3a and 3b are valid for the demodulation of the signals. Any combination of the cases 3a–3d is conceivable.

The method of the invention comprises a compensation of the dispersion of two or more different irradiated wavelengths. This is accomplished by shifting the received and converted interference signals against each other, by the spatial shift expected due to their dispersion D. The shift ΔS amounts to:

$$\Delta S = D \cdot c \cdot (\lambda_1 - \lambda_2) \cdot 2z_o \tag{3}$$

with c=speed of light, $z_o$=total light path. After the digitalization of the interference signals, the shift is reflected in a corresponding storage cell difference of the values which represent the demodulation signals of the two central wavelengths. Thus, a corresponding shift of the saved signals or storage cells, respectively, can take place in order to correct the dispersion.

Figure 4A:
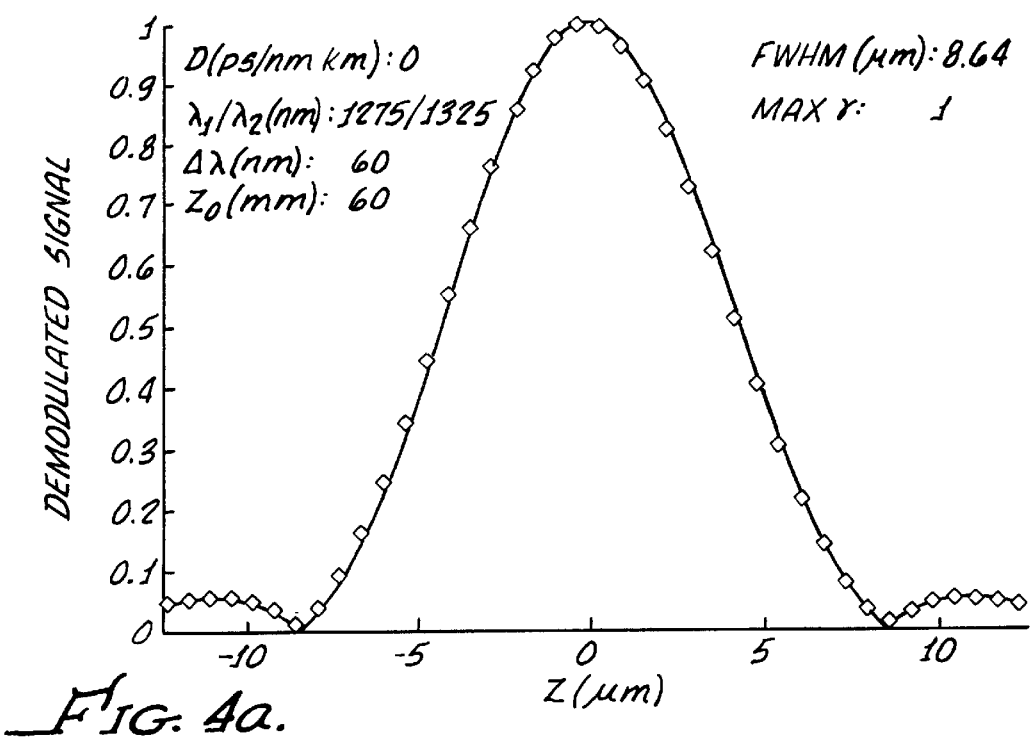
FIGS. 4a–d show demodulated signals with two light beam wavelengths,
without dispersion—theoretically—
with a dispersion of 3.3 ps/nm·km
with a dispersion of 6.6 ps/nm·km
also with a dispersion of 6.6 ps/nm·km, but with a shift of the interference signals, according to the invention.
Figure 4B:
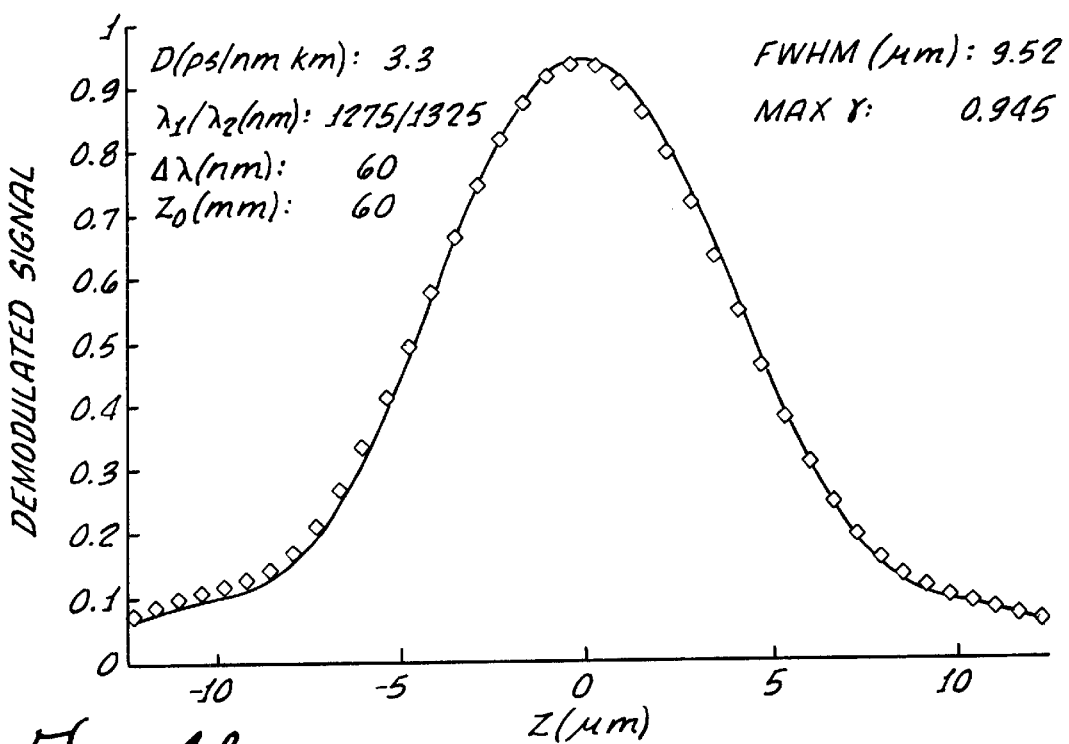

FIG. 4a shows a theoretical demodulated signal, obtained by calculation, without a dispersion, for central wavelengths λ1 of 1275 nm and λ2 of 1325 nm, thus, for a difference of 50 nm. For an individual bandwidth of both central wavelengths of Δλ=60 nm, a mean full width half maximum of 8.64 μm results.

The influence of the dispersion of the individual bandwidth of a light source is considered as negligible if the phase shift caused by dispersion is about π/4. This means that the dispersion (1$^{st}$ order) must comply with the following criterion:

$$D \le \frac{\lambda_n}{\Delta \lambda^2} \cdot \frac{1}{4c(2z_0)} \tag{4}$$

The following example shall explain the facts: For a central wavelength of $\lambda_n$=1300 nm, an individual bandwidth of Δλ=60 nm and a supposed geometrical length (forward and backward travel of the light) of the object arm and the reference arm, respectively, of $2z_o$=120 mm, a dispersion of |D|≦3.3 ps/(km·nm) results (for light speed of c=3.0 mm/ps). Such a dispersion value can in practice be obtained by a very symmetrical design of the optical arms, or by a compensation with corresponding optical materials.

However, from the square dependence of the dispersion with respect to the individual bandwidth stated in equation (4) above, it is readily apparent that a bandwidth increase of the individual light sources to values of more than 60 nm, quickly exceeds the limits set above, so that dispersion significantly deteriorates the measurement signal quality. For example, a bandwidth of approximately 100 nm results in a dispersion of approximately 6.6 ps/(km·nm). This results in a mean full width half maximum of 12.3 μm, leading to a deterioration of the spatial resolution of 42%.

Figure 4C:
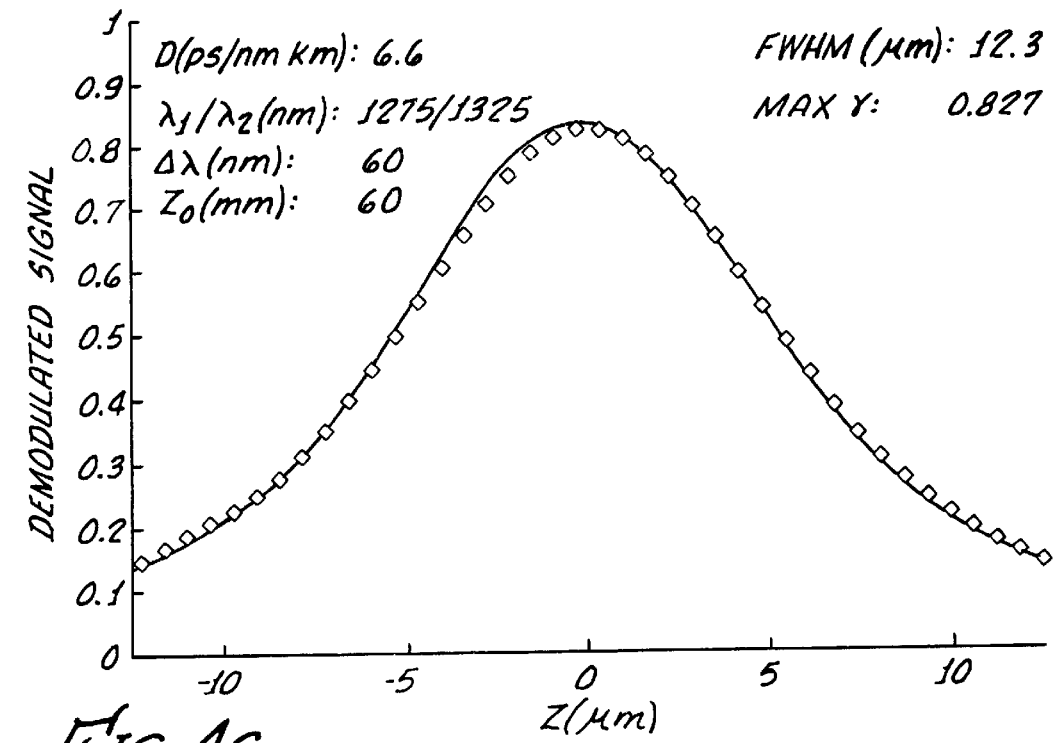
Figure 4D:
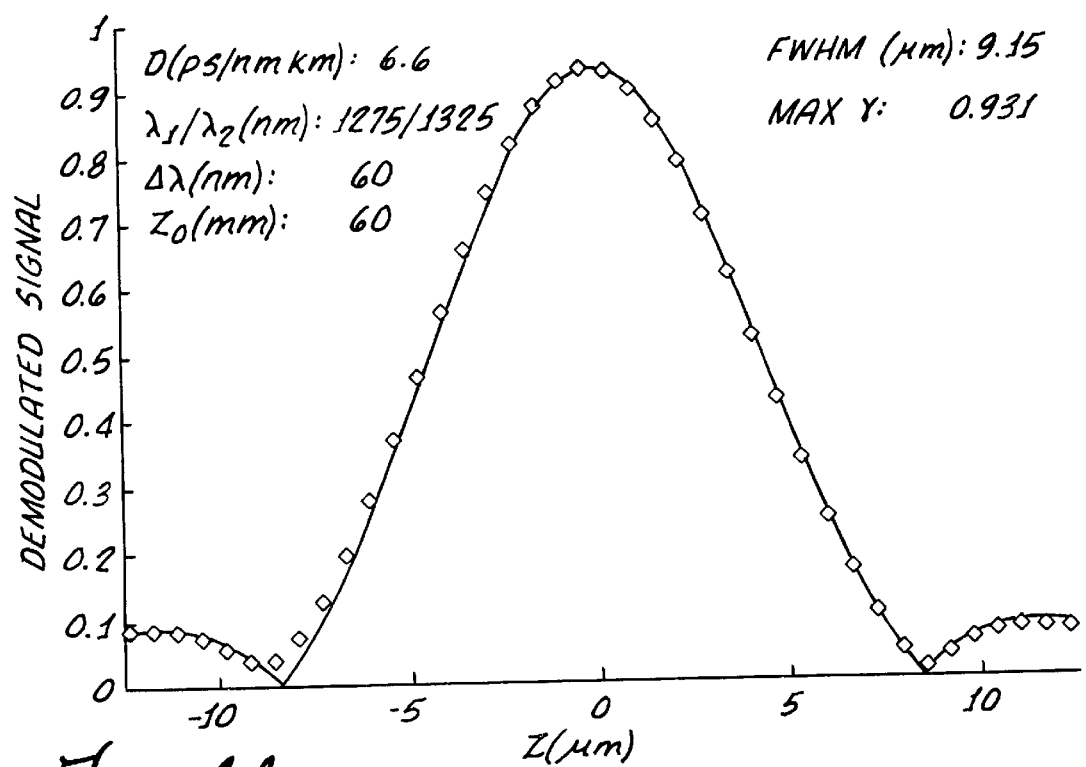

For this dispersion of 6.6 ps/(nm·km), all other values being the same, the interference signal shift according to the invention allows the reduction of the mean full width half maximum to 9.15 μm, as shown in FIG. 4d. This value is only 11% worse than the theoretical value of FIG. 4a.

Furthermore, according to a preferred embodiment of the invention it is suggested that the magnitude difference between the added signals (in-phase-signal, $I_n$) and the subtracted signals (out-off-phase-signal $I_{out}$) of both central wavelengths is determined according to the following equation:

$$I_{ges} = |I_{in} - W \cdot I_{out}| \tag{1}$$

wherein $I_{ges}$ is the resulting overall intensity and W is a weighting factor.

Figure 5C:
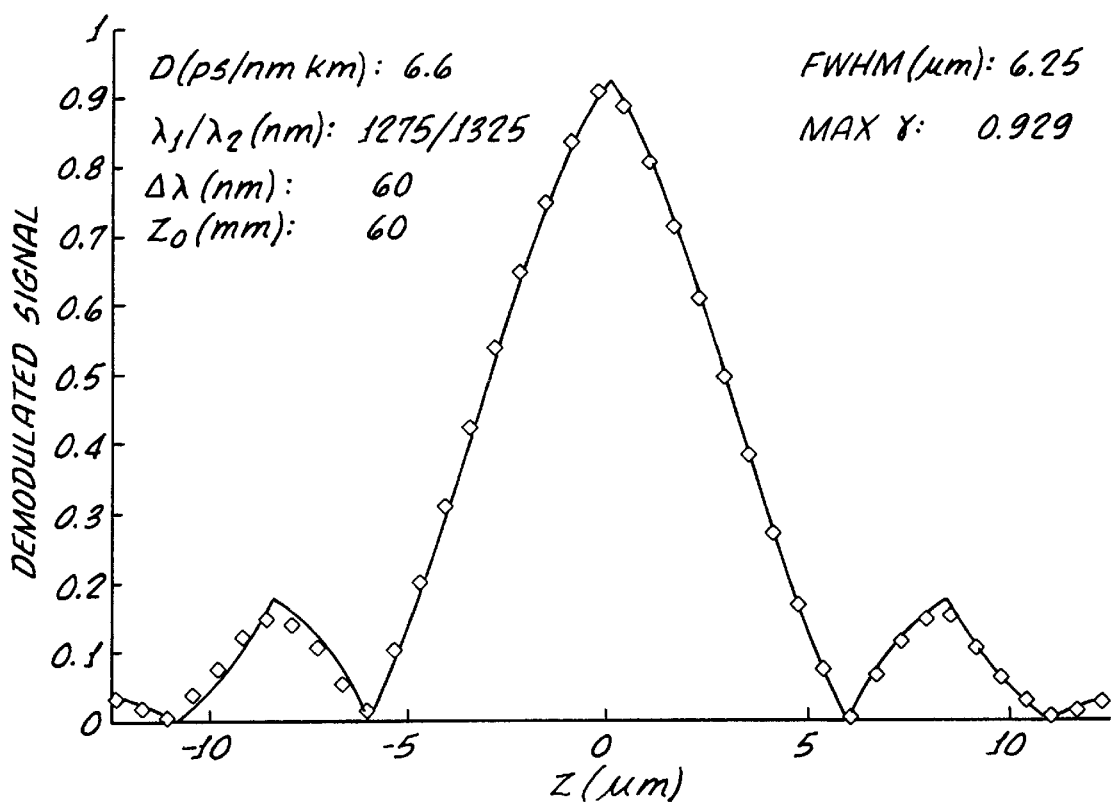

FIG. 5 shows an example for a weighting factor W=0.5. It is true that a lower dispersion of D=3.3 ps/(nm·km) slightly deteriorates the FWHM of FIG. 5b as compared to a dispersion of D=0; however, the height of the (interfering) side bands is reduced. A deliberately introduced low dispersion is conceivable, too. For an increased dispersion, as e.g. D=6.6 ps/(nm·km) in FIG. 5c, the dispersion correction significantly improves the FWHM of the principal maximum.

The determination of movement speeds (equation (2)) causing a Doppler effect in the material to be examined, is represented in FIG. 6. The figures show the phase in rad of a dispersion-compensated interference signal as a function of the position of the reference mirror.

Figure 6A:
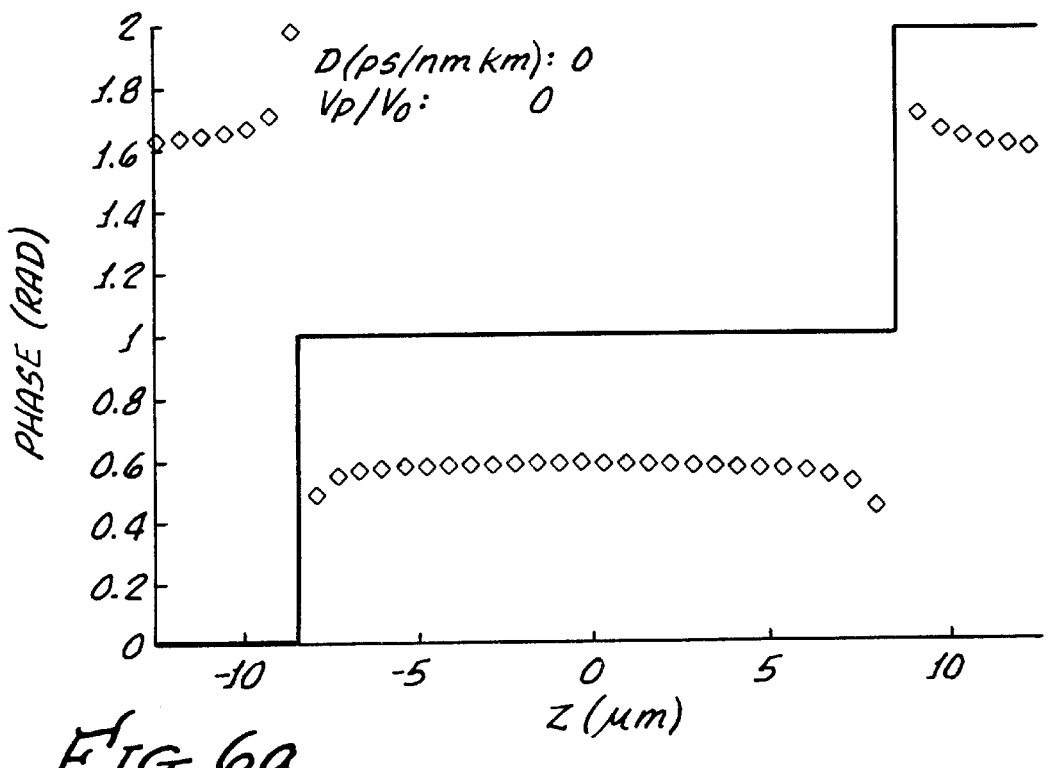
FIGS. 6a–d show diagrams related to the influence of the dispersion onto the phase trajectory, and for the determination of a travel velocity in the object to be examined, based upon the phase positions in the interference signal.
Figure 6B:
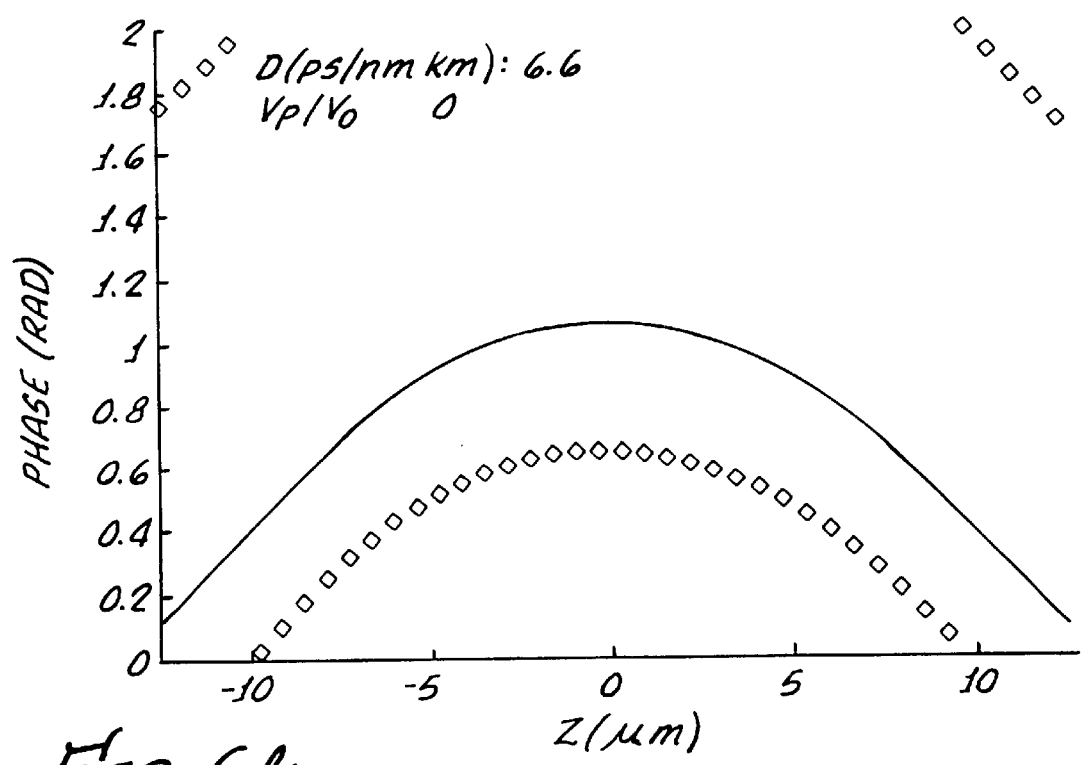
Figure 6C:
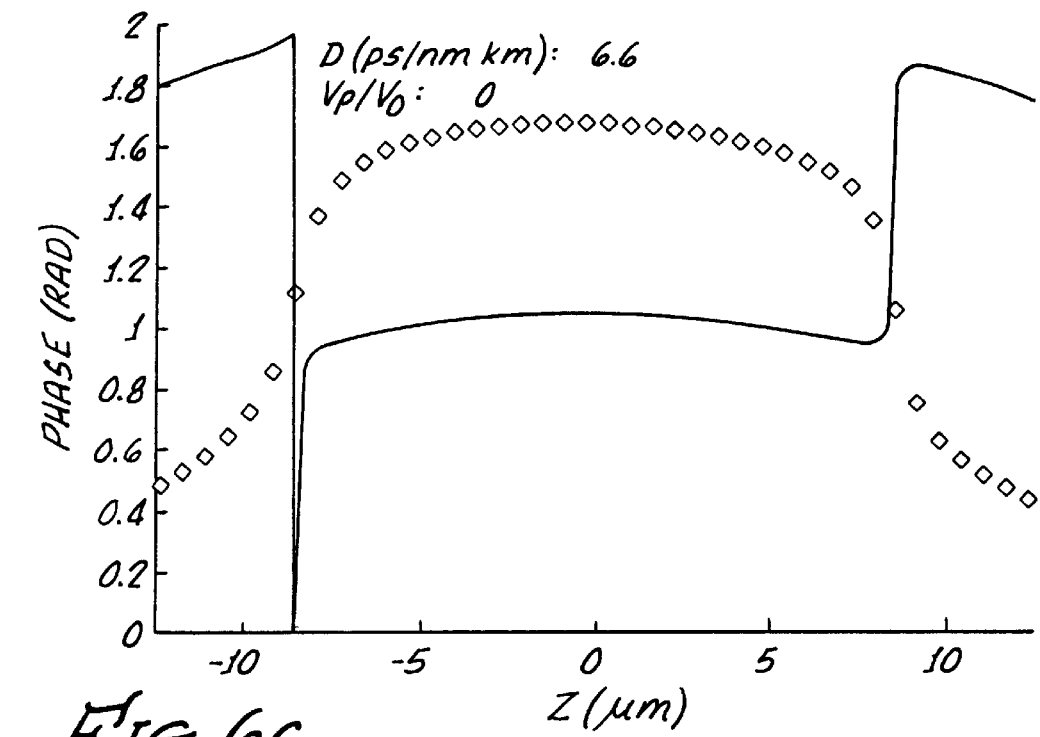

FIG. 6a shows the phase as a function of the depth z. It contains complementary information to the mere magnitude image in FIG. 4a. The velocity of the dispersed particle is zero. The dispersion was set to zero, too. In FIG. 6b, a dispersion of D=6.6 ps/(nm·km) is supposed (a complementary magnitude image is shown in FIG. 4c). The phase curve at z=0 is non-linear, thus, a linearized fit according to equation (2) is quite difficult. After the compensation of the dispersion (FIG. 6c) the phase curve at z=0 is significantly linearized. As expected, the matched phase change is zero.

Figure 6D:
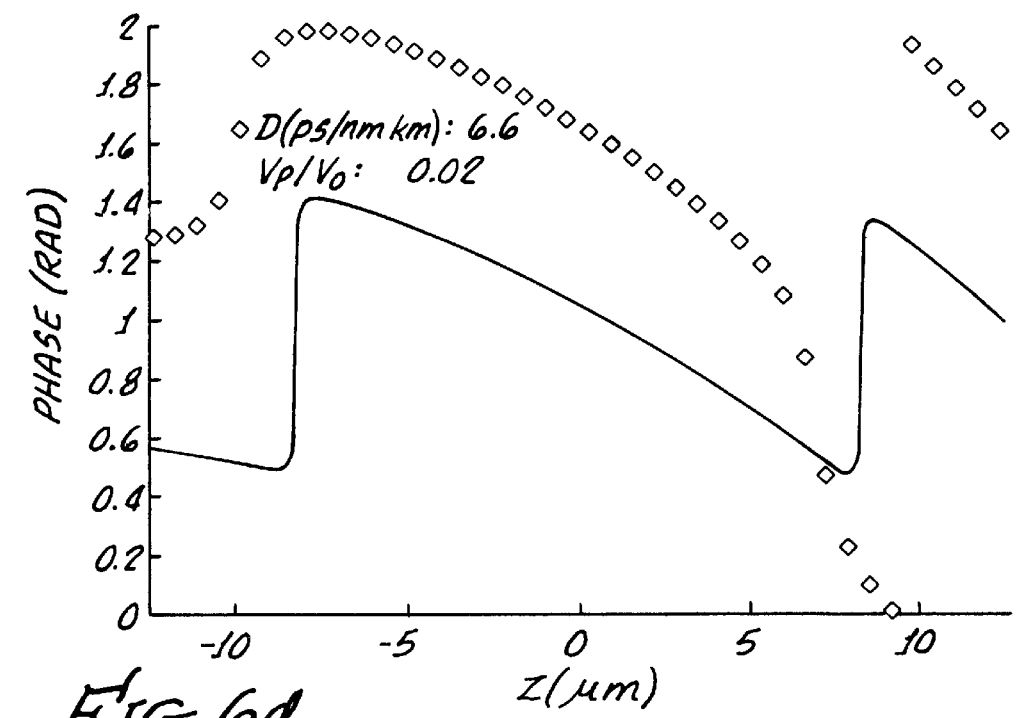

A phase change at z=0, of Δϕ/Δz=0.06 π/μm—with the parameters corresponding to those of FIG. 4d—can be taken from FIG. 6d; thus, as to equation (2), for a mean central wavelength of λ=1.3 μm a velocity ratio $v_p/v_o$ of 0.02, and, for a velocity of the depth scan of $v_o$=50 mm/sec, a particle velocity of 1 mm/sec results.

What is claimed is:

1. Apparatus for the interferometric examination of a scattering object with an optical coupler, a reference mirror and a detector module in the light path, the apparatus comprising:
   at least two light sources (2, 2') with different central wavelengths (λ1, λ2);
   a digitalization unit (18) connected to the detector module (15), for digitalization of received, converted interference signals of light of the at least two light sources (2, 2'); and a shifting unit (20) for shifting a phase position of the central wavelength ($\lambda 1$, $\lambda 2$) in order to compensate expected dispersion of the phase position.

2. Apparatus according to claim 1, having a difference formation unit serving for the formation of a magnitude difference between the added signals (in-phase-signal, $I_{in}$) and the subtracted signals (out-off-phase-signal $I_{out}$) from the two central wavelengths ($\lambda 1$, $\lambda 2$), according to:

$$I_{ges}=||I_{in}-W\cdot|I_{out}||,$$

wherein W is a weighting factor.

3. Apparatus according to claim 1, comprising a phase and velocity determination unit (22, 23), in order to determine velocities $V_p$ in the object, according to $$V_p/v_o=(\lambda/4\pi)\cdot(\Delta\phi/\Delta Z) \qquad (2)$$

wherein $\lambda$ is one of the central wavelengths, $V_o$ is the velocity of the reference mirror and $\Delta\phi=\phi(z_1)-\phi(z_2)$ is the phase shift.

4. Apparatus according to claim 1, wherein the light sources are designed as a one- or two-dimensional array.

5. Apparatus according to claim 1, wherein the light sources are designed as surface light sources.

6. Apparatus according to claim 5, wherein surface light sources are surface emitting LED's.

7. Apparatus according to claim 1, wherein the detector is designed as an one- or two-dimensional array or as a CCD detector.

8. A method for interferometric examination of a scattering object using an interferometer having a light source, a sample arm, a reference arm and a detector arm, the method comprising the steps of:

dividing intensity-modulated light of at least two different central wavelengths into a first partial beam, traveling along the sample arm, and a second partial beam, traveling along the reference arm;

irradiating the scattering object with the first partial beam to produce scattered light;

directing the second partial beam to a reference mirror to produce a reflected second partial beam;

combining at least some of the scattered light and at least some light of the reflected second partial beam along the detector arm to a detector module;

opti-electronically converting the combined scattered light and light of the reflected second partial beam in the detection module into at least two interference signals with different central wavelength; and shifting the converted interference signals relative to each in order to compensate expected dispersion of phase position.

9. The method according to claim 8 further comprising the step of digitizing and storing the converted interference signals before shifting the converted interference signals relative to each other.

10. The method according to claim 9 wherein the at least two different central wavelengths of the intensity-modulated light have a phase shift of approximately $\pi/2$.

11. The method according to claim 8 wherein the intensity modulated light is modulated with continuous intensity modification.

12. The method according to claim 11 wherein the intensity modulated light is modulated sinusoidally.

13. The method according to claim 8 wherein the intensity modulated light is modulated digitally.

14. The method according to claim 8 further comprising the step of adding the at least two interference signals to form an in-phase signal, $I_{in}$, subtracting the at least two interference signals from one another to form an out-of-phase signal, $I_{out}$, and determining a difference of magnitudes of the in-phase signal, $I_{in}$, and the out-of-phase-signal, $I_{out}$, using a weighting factor W according to $$I_{ges}=|I_{in}-W-|I_{out}||.$$

15. The method according to claim 8 wherein signal magnitudes of the interference signals are formed and added incoherently.

16. The method according to claim 8 further comprising the step of moving the reference mirror with a velocity in order to obtain depth sampling of the scattering object.

17. Apparatus for the interferometric examination of a scattering object, the apparatus comprising:

at least two light sources (2, 2') with different central wavelengths ($\lambda 1$, $\lambda 2$);

an optical combiner (4) for combining light from each of the at least two light sources into an optical waveguide (5);

an optical coupler (6) for dividing the combined light into a sample arm (7) and a reference arm (8), said sample arm (7) being disposed for irradiating the scattering object with a first partial beam of the divided light and receiving scattered light, said referenced arm (8) being disposed for irradiating a mirror (12) and receiving reflected light;

a light detector (14) for receiving both scattered and reflected light;

a digitalization unit (18) connected to said light detector (14) for digitalization of received converted interference signals between the scattered and reflected light from the two light sources; and a shifting unit (20) for shifting a phase position of the centered wavelengths ($\lambda 1$, $\lambda 2$) in order to compensate expected dispersion of the phase position.

* * * * *